No. 771,438. PATENTED OCT. 4, 1904.
T. McDONALD & W. McKEE.
CONVEYER.
APPLICATION FILED MAR. 1, 1904.
NO MODEL. 2 SHEETS—SHEET 1.
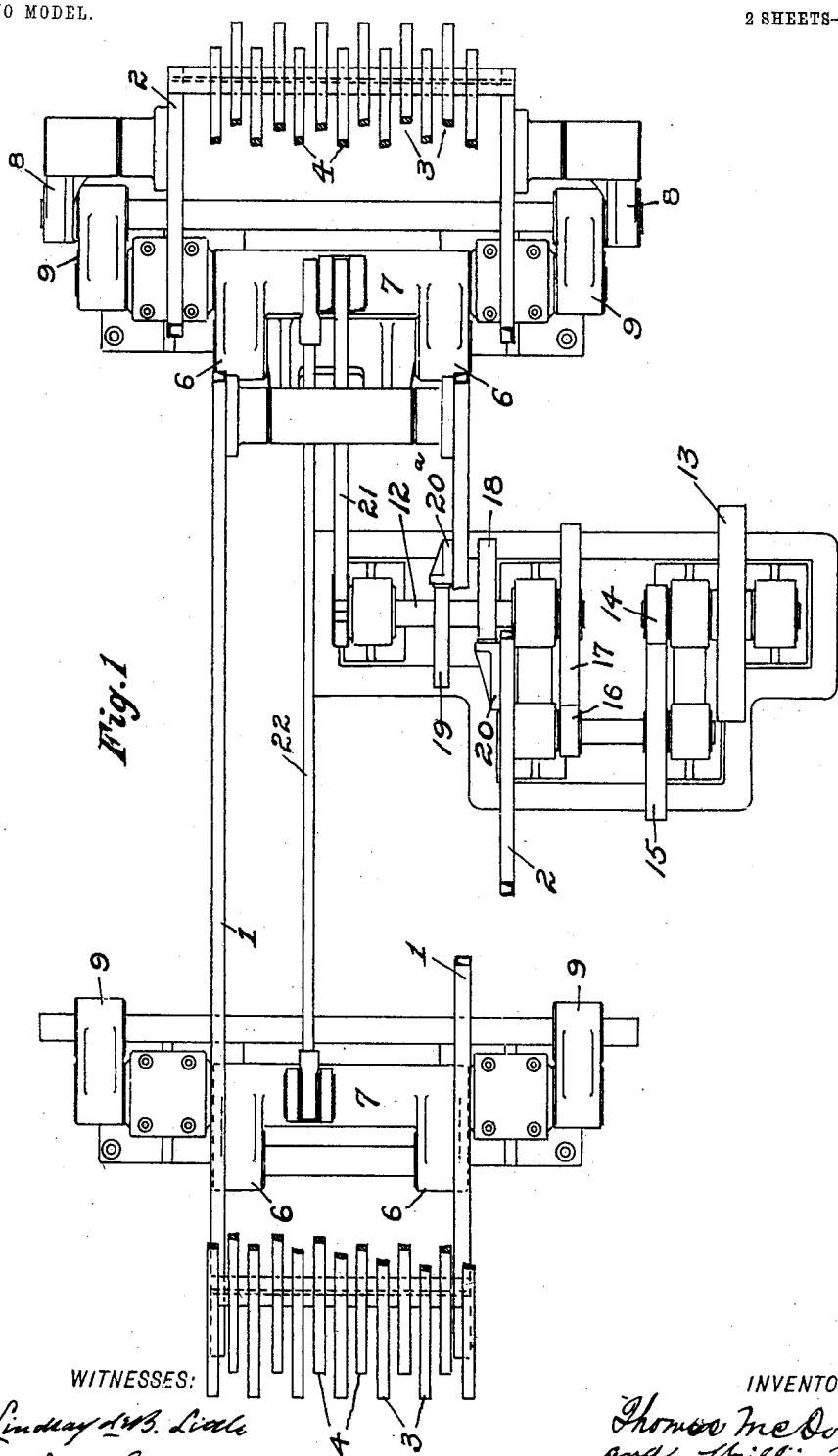
WITNESSES: INVENTORS
Thomas McDonald
and Willis McKee
by W. G. Doolittle
ATTORNEY No. 771,438. PATENTED OCT. 4, 1904.
T. McDONALD & W. McKEE.
CONVEYER.
APPLICATION FILED MAR. 1, 1904.
NO MODEL. 2 SHEETS—SHEET 2.
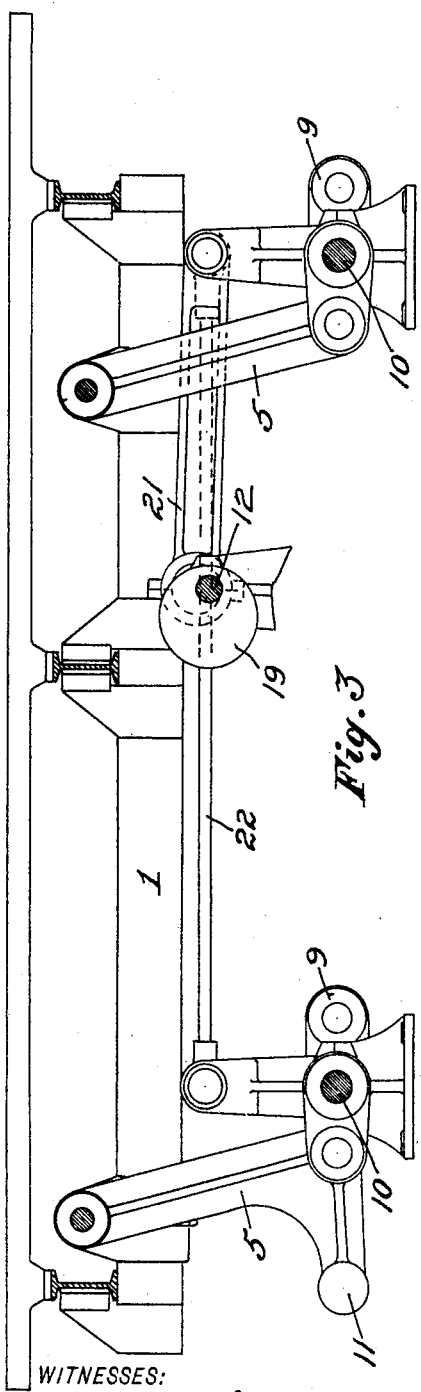
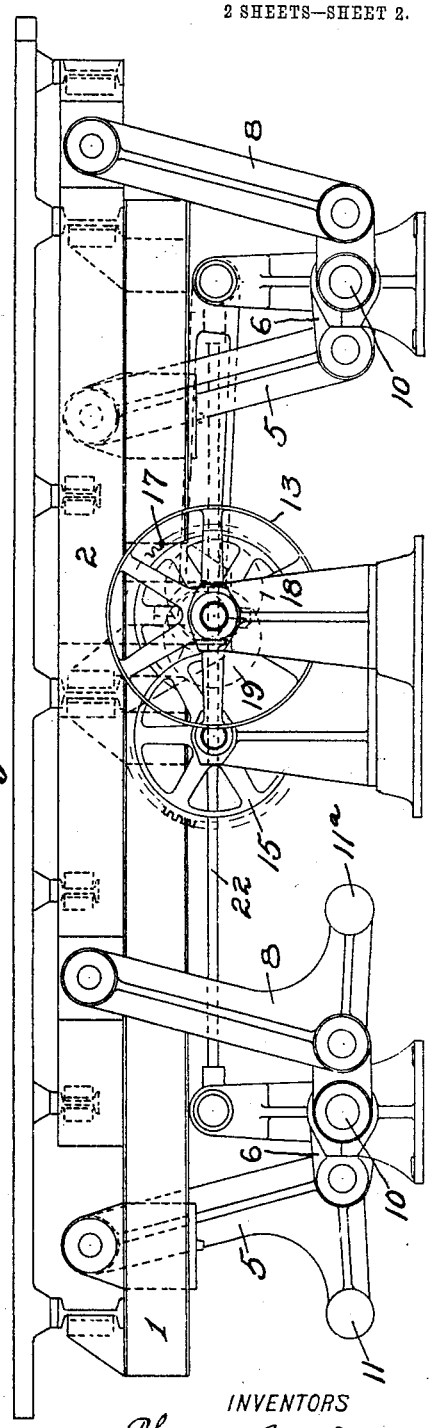
WITNESSES:
Lindsay deB. Little
O. D. Thompson
INVENTORS
Thomas McDonald
and Willis McKee
by W. G. Doolittle
ATTORNEY No. 771,438.

Patented October 4, 1904.

UNITED STATES PATENT OFFICE.

THOMAS McDONALD AND WILLIS McKEE, OF YOUNGSTOWN, OHIO.

CONVEYER.

SPECIFICATION forming part of Letters Patent No. 771,438, dated October 4, 1904.

Application filed March 1, 1904. Serial No. 196,084. (No model.)

*To all whom it may concern:*

Be it known that we, THOMAS McDONALD and WILLIS McKEE, citizens of the United States, residing at Youngstown, in the county of Mahoning and State of Ohio, have invented new and useful Improvements in Conveyers, of which the following is a specification.

The object of our invention is to provide a new and improved conveyer; and to this end the present invention consists of a conveyer and in the novel features of construction and combination of parts, all as fully hereinafter described and particularly claimed.

In the accompanying drawings, which illustrate an application of our invention, Figure 1 is a plan view of a conveyer constructed in accordance with our invention; Fig. 2, a side elevational view showing two movable frames and means for effecting movements of the frames; and Fig. 3, a side elevational view similar to Fig. 2, showing one movable frame.

Referring to the drawings, the conveyer as illustrated comprises two movable frames 1 and 2, on each of which is respectively mounted a set of supports 3 and 4. Frame 1 is supported by movable standards 5, which standards in turn are carried on arms 6 of bell-cranks 7, and frame 2 is supported by movable standards 8, carried on bell-cranks 9. The bell-cranks 7 and 9 are mounted on shafts 10. Standards 5 and 8 are preferably provided with weights 11 and $11^a$.

The construction and the arrangement of parts of each movable frame is such that they counterbalance one another, thereby requiring much less power to move the frames and the material being conveyed than would be the case were the frames not counterbalanced, as shown.

As illustrated, 12 represents a power-shaft, which is driven by means of driving-pulley 13 and intermediate gear mechanism, comprising a pinion 14, gear 15, pinion 16, and gear 17. Mounted on shaft 12 are two eccentrics 18 and 19. Each of these eccentrics is arranged to bear against a bracket 20 and $20^a$, carried on each of the movable frames.

Driving-rod 21 connects one of the bell-cranks 7 with power-shaft 12, and connecting-rod 22 joins the two bell-cranks 7.

Movements of the movable frames and their sets of supporting rails or beams are effected by revolving power-shaft 12, a positive vertical movement of each frame being effected through the medium of bell-cranks 7 and 9, driving-rod 21, and connecting-rod 22, and a positive longitudinal movement of each frame by eccentrics 18 and 19 bearing against brackets 20 and $20^a$. Combining these two positive motions of each frame produces either a curved or an elliptical movement of each frame, and by varying the vertical or the longitudinal movement, or both, we are enabled to obtain any desirable curved or elliptical movement for each frame.

The means employed for moving the frames are so arranged that both frames will be in motion at the same time, one frame moving in the upper half of its orbit while the other frame is in the lower half of its orbit. The employment of two movable frames, as shown, both in motion at the same time, provides for a rapid passage of the material over the conveyer.

In our conveyer the load or material being conveyed is given a positive forward motion and passes over the conveyer without sliding contact. The material having been placed on the conveyer is lifted by the supports mounted on one of the movable frames, carried forward the length of the longitudinal movement of the frame, and transferred to the supports of the other movable frame, by which it is again lifted, carried forward, and transferred to the supports of the first-mentioned frame.

What we claim is—

1. In a conveyer, two movable frames, each frame having a set of supports for the material being conveyed, and means for effecting a curved movement of each frame for the purpose of giving a positive forward motion to the material being conveyed, substantially as set forth.

2. In a conveyer, two counterbalanced movable frames, each frame having a set of supports for the material being conveyed, and means for effecting a curved movement of each frame for the purpose of giving a positive forward motion to the material being conveyed, substantially as set forth.

3. In a conveyer, two movable frames, and means for effecting an elliptical movement of each frame, substantially as set forth.

4. In a conveyer, two counterbalanced movable frames, and means for effecting an elliptical movement of each frame, substantially as set forth.

5. In a conveyer, two movable frames, each frame having a set of supports for the material being conveyed, said supports of each set arranged parallel with and intermediate of each other, and means for effecting a curved movement of each set of supports for the purpose of giving a positive forward motion to the material being conveyed, substantially as set forth.

6. In a conveyer, two counterbalanced movable frames, each frame having a set of supports for the material being conveyed, said supports of each set arranged parallel and intermediate of each other, and means for effecting a curved movement of each set of supports for the purpose of giving a positive forward motion to the material being conveyed, substantially as set forth.

7. In a conveyer, two movable frames, each frame provided with a set of supports for the material being conveyed, means for effecting a curved movement of each set of supports comprising a power-shaft, bell-cranks, movable standards for supporting the movable frames, a driving-rod connecting the bell-cranks and the power-shaft, a connecting-rod joining the bell-cranks, and eccentrics on the power-shaft arranged to make contact with parts on the movable frames, substantially as set forth.

8. In a conveyer, two movable frames, each frame having a set of supports for the material being conveyed, so arranged as to counterbalance each other, and means for effecting a curved movement of each frame, substantially as set forth.

In testimony whereof we have signed our names to this specification in the presence of two subscribing witnesses.

THOMAS McDONALD.
     WILLIS McKEE.

Witnesses:
 PAUL L. OTT,
 WARREN F. PERRY.